United States Patent
Kim et al.

(10) Patent No.: US 9,733,672 B2
(45) Date of Patent: Aug. 15, 2017

(54) ROLLABLE DISPLAY

(71) Applicant: Samsung Display Co., Ltd., Yongin-si, Gyeonggi-do (KR)

(72) Inventors: Youn Joon Kim, Seoul (KR); Sang Jo Lee, Hwaseong-si (KR); Jung Hun Lee, Hwaseong-si (KR); Jusuck Lee, Seoul (KR); Mi Jang, Suwon-si (KR); Kyung Min Choi, Seoul (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/826,021

(22) Filed: Aug. 13, 2015

(65) Prior Publication Data

US 2016/0239050 A1 Aug. 18, 2016

(30) Foreign Application Priority Data

Feb. 13, 2015 (KR) .................. 10-2015-0022405

(51) Int. Cl.
G06F 1/16 (2006.01)

(52) U.S. Cl.
CPC .................. *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,771,232 B2 * | 8/2004 | Fujieda | ................ | G06F 1/1615 345/30 |
| 7,786,951 B2 * | 8/2010 | Huitema | ............... | G06F 1/1601 345/1.1 |
| 8,001,711 B2 * | 8/2011 | LaFarre | .................. | G02F 1/167 40/515 |
| 8,493,714 B2 * | 7/2013 | Visser | ................... | G06F 1/1613 361/679.01 |
| 8,508,920 B2 * | 8/2013 | Huitema | ............... | G06F 1/1601 312/223.3 |
| 8,953,327 B1 * | 2/2015 | Salmon | ................. | G06F 1/1652 160/242 |
| 9,013,431 B2 * | 4/2015 | Choi | ....................... | G06F 3/041 345/173 |
| 9,019,313 B2 * | 4/2015 | Kwack | .................. | G06F 1/1652 345/173 |
| 9,098,241 B1 * | 8/2015 | Cho | ........................ | H05K 1/028 |
| 9,120,290 B2 * | 9/2015 | Krall | ........................ | B32B 3/14 |

(Continued)

FOREIGN PATENT DOCUMENTS

JP 2008-500593 A 1/2008
JP 5351114 B2 8/2013
(Continued)

*Primary Examiner* — Lisa Lea Edmonds
(74) *Attorney, Agent, or Firm* — Knobbe, Martens, Olson & Bear, LLP (57) ABSTRACT

A rollable display is disclosed. In one aspect, the rollable display includes a flexible display panel, a housing having an internal space defined therein, and a rolling member positioned in the housing and configured to have the flexible display panel rolled therearound. The rollable display also includes a guide member positioned in the housing and having a coil shape. The guide member is configured to separate portions of the flexible display panel from each other.

19 Claims, 5 Drawing Sheets

(56) References Cited

U.S. PATENT DOCUMENTS

| | | | |
|---|---|---|---|
| 9,189,028 B2* | 11/2015 | Nakhimov | G06F 1/1652 |
| 9,215,301 B2* | 12/2015 | van Aerle | G06F 1/1601 |
| 9,244,494 B2* | 1/2016 | Hinson | G06F 15/025 |
| 2004/0052037 A1* | 3/2004 | Sawyer | G06F 1/1601 |
| | | | 361/679.05 |
| 2005/0040962 A1* | 2/2005 | Funkhouser | G06F 1/1601 |
| | | | 340/815.4 |
| 2007/0241002 A1* | 10/2007 | Wu | G06F 1/1601 |
| | | | 206/150 |
| 2008/0247126 A1* | 10/2008 | Otsuka | G06F 1/1601 |
| | | | 361/679.06 |
| 2010/0033435 A1* | 2/2010 | Huitema | G06F 1/1615 |
| | | | 345/173 |
| 2010/0194785 A1* | 8/2010 | Huitema | G02F 1/133305 |
| | | | 345/690 |
| 2012/0050075 A1* | 3/2012 | Salmon | G06F 1/1626 |
| | | | 341/20 |
| 2013/0127799 A1* | 5/2013 | Lee | G06F 1/1652 |
| | | | 345/204 |
| 2013/0234951 A1* | 9/2013 | Kim | G06F 3/0481 |
| | | | 345/173 |
| 2015/0268914 A1* | 9/2015 | Kim | G06F 3/1423 |
| | | | 345/1.3 |
| 2016/0029474 A1* | 1/2016 | Cho | H05K 1/028 |
| | | | 361/749 |
| 2016/0034000 A1* | 2/2016 | Lee | G06F 1/1652 |
| | | | 361/749 |
| 2016/0054758 A1* | 2/2016 | Han | G06F 1/1652 |
| | | | 361/679.26 |
| 2016/0120022 A1* | 4/2016 | Lee | G06F 1/1652 |
| | | | 361/749 |
| 2016/0120023 A1* | 4/2016 | Choi | H05K 1/028 |
| | | | 361/749 |
| 2016/0187929 A1* | 6/2016 | Kim | G06F 1/1652 |
| | | | 345/184 |
| 2016/0191690 A1* | 6/2016 | Park | H04M 1/72519 |
| | | | 455/566 |

FOREIGN PATENT DOCUMENTS

| | | |
|---|---|---|
| KR | 10-0818170 B1 | 3/2008 |
| KR | 10-2010-0016501 A | 2/2010 |
| WO | WO 2005/114309 A1 | 12/2005 |

* cited by examiner

ROLLABLE DISPLAY

INCORPORATION BY REFERENCE TO ANY PRIORITY APPLICATIONS

This application claims priority to and the benefit of Korean Patent Application No. 10-2015-0022405 filed in the Korean Intellectual Property Office on Feb. 13, 2015, the entire contents of which are incorporated herein by reference.

BACKGROUND

Field

The described technology generally relates to a rollable display.

Description of the Related Technology

As a part of the rapid development of electronic devices and the rapid changes of the information age, smart phones have been developed to be capable of performing multimedia functions such as mobile Internet access, video and audio playback, as well as schedule management. Smart phone screens have been gradually increasing in size such that various kinds of information can be more easily displayed. Furthermore, tablets including screens with displays that are 8 inches or greater have also been developed.

As screen size increases, it becomes easier to view videos, etc. However, mobile device portability decreases with increasing screen size. In order to increase portability, display panels that can be bent or rolled around a roller have been suggested.

SUMMARY OF CERTAIN INVENTIVE ASPECTS

One inventive aspect is a rollable display that can prevent a display panel from being scratched even when foreign materials are attached to the display panel.

Another aspect is a rollable display including: a flexible display panel; a body member having an internal space formed therein; a rolling member rotatably positioned in the body member and having the flexible display panel rolled therearound; and a guide member having a coil shape, positioned in the body member, and allowing portions of the flexible display panel not to be closely adhered to each other.

The flexible display panel can include a display area in which an image is displayed, and the display area can be positioned so as to correspond to the guide member in a state in which the flexible display panel is rolled around the rolling member.

The rollable display can further include: a knob member having a stick shape and formed at one end of the flexible display panel.

The body member can have a slit part formed therein so as to penetrate therethrough so that the flexible display panel enters the body member or exits from the body member, and a foreign material introduction preventing member can be formed along an edge of the slit part and be positioned so as to be closely adhered to upper and lower surfaces of the flexible display panel.

The foreign material introduction preventing member can be formed of any one of brush, cloth, and rubber.

One end of the guide member can be positioned adjacently to the rolling member, and the other end thereof can be positioned adjacently to the slit part.

The guide member can have a static electricity preventing coating layer formed on a surface thereof that the flexible display panel contacts.

Another aspect is a rollable display comprising a flexible display panel; a housing having an internal space defined therein; a rolling member positioned in the housing and configured to have the flexible display panel rolled therearound; and a guide member positioned in the housing and having a coil shape, wherein the guide member is configured to separate portions of the flexible display panel from each other.

In exemplary embodiments, the flexible display panel includes a display area configured to display an image and wherein the display area is configured to be supported by the guide member when the flexible display panel is rolled around the rolling member. The length of the guide member can be substantially the same as the length of the display area of the flexible display panel.

In exemplary embodiments, the housing has an opening formed therein, wherein the flexible display panel is configured to be withdrawn from the opening, wherein the rollable display further comprises a foreign material introduction preventing member formed along an edge of the opening, and wherein foreign material introduction preventing member is configured to be in close contact with upper and lower surfaces of the flexible display panel.

In exemplary embodiments, the foreign material introduction preventing member is formed of at least one of the following: brush, cloth, and rubber. One end of the guide member can be positioned adjacent to the rolling member, and the other end of the guide member can be positioned adjacent to the opening.

In exemplary embodiments, the guide member has a static electricity preventing coating layer formed on a surface thereof, and wherein the flexible display panel is configured to contact the guide member via the static electricity preventing coating layer.

In exemplary embodiments, the rolling member comprises a circuit board configured to driver the flexible display panel and wherein the rolling member is connected to the flexible display panel via the circuit board.

In exemplary embodiments, the flexible display panel includes a display area configured to display an image and a non-display area, wherein the flexible display panel is connected to the rolling member via the non-display area, wherein the guide member is spaced apart from the rolling member, and wherein the non-display area is configured to be rolled around the rolling member a plurality of times between the rolling member and the guide member.

The rollable display according to at least one exemplary embodiment includes a guide member. The guide member enables portions of the flexible display panel positioned adjacently to each other to be spaced apart from each other when the flexible display panel is rolled around the rolling member or is unrolled from the rolling member. Contact between the portions of the flexible display panel is prevented by the guide member, thereby making it possible to prevent the flexible display panel from being scratched due to the foreign materials.

DETAILED DESCRIPTION OF CERTAIN INVENTIVE EMBODIMENTS

Rollable displays include a display panel that can be rolled around and unrolled from a roller. Portions of the display panel overlap and contact each other when rolled around the roller. Foreign materials can become attached to the display panel when it is unrolled and can then be trapped between overlapping surfaces of the display panel when it is rolled. When positioned between the display panel surfaces, the foreign material scratches the surfaces of the display panel.

Hereinafter, exemplary embodiments will be described in detail with reference to the accompanying drawings so that those skilled in the art to which the described technology pertains can easily practice the described technology. However, the present disclosure can be implemented in various different for and is not limited to exemplary embodiments provided herein.

Portions unrelated to the description will be omitted in order to more clearly describe the present disclosure. Similar components will be denoted by the same reference numerals throughout the present specification.

In addition, in several exemplary embodiments, components having the same configuration will be representatively described using the same reference numerals in an exemplary embodiment, and only components different from those of an exemplary embodiment will be described in the other exemplary embodiments.

Throughout the present specification, when any one part is referred to as being "connected to" another part, the any one part and another part can be "directly connected to" each other or "indirectly connected to" each other with an additional part interposed therebetween. In addition, throughout the present specification, unless explicitly described to the contrary, the word "comprise" and variations such as "comprises" or "comprising" will be understood to imply the inclusion of stated elements but not the exclusion of any other elements.

Figure 1:
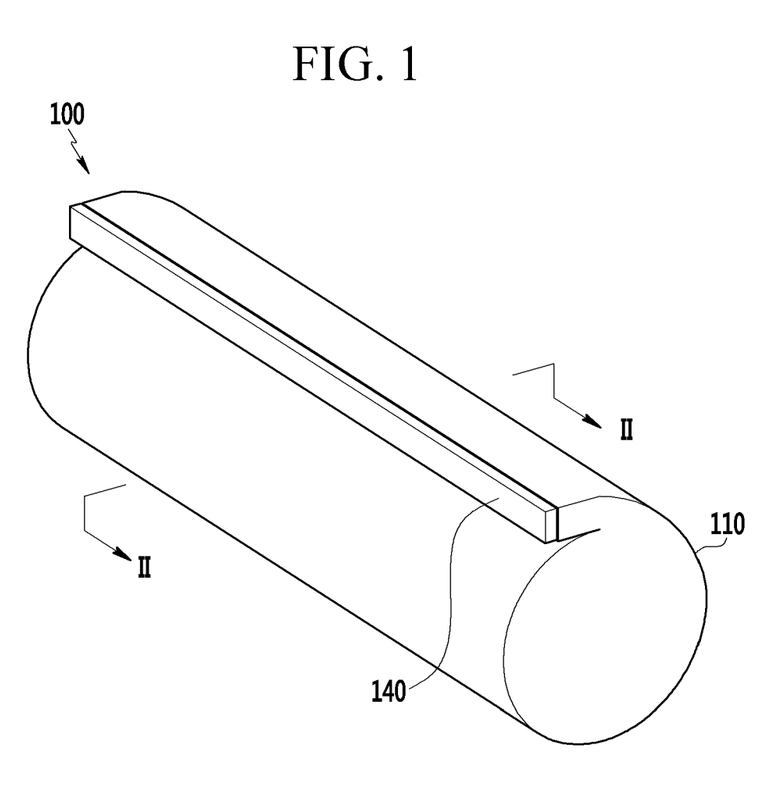
FIG. 1 is a perspective view showing a rollable display according to an exemplary embodiment.
Figure 2:
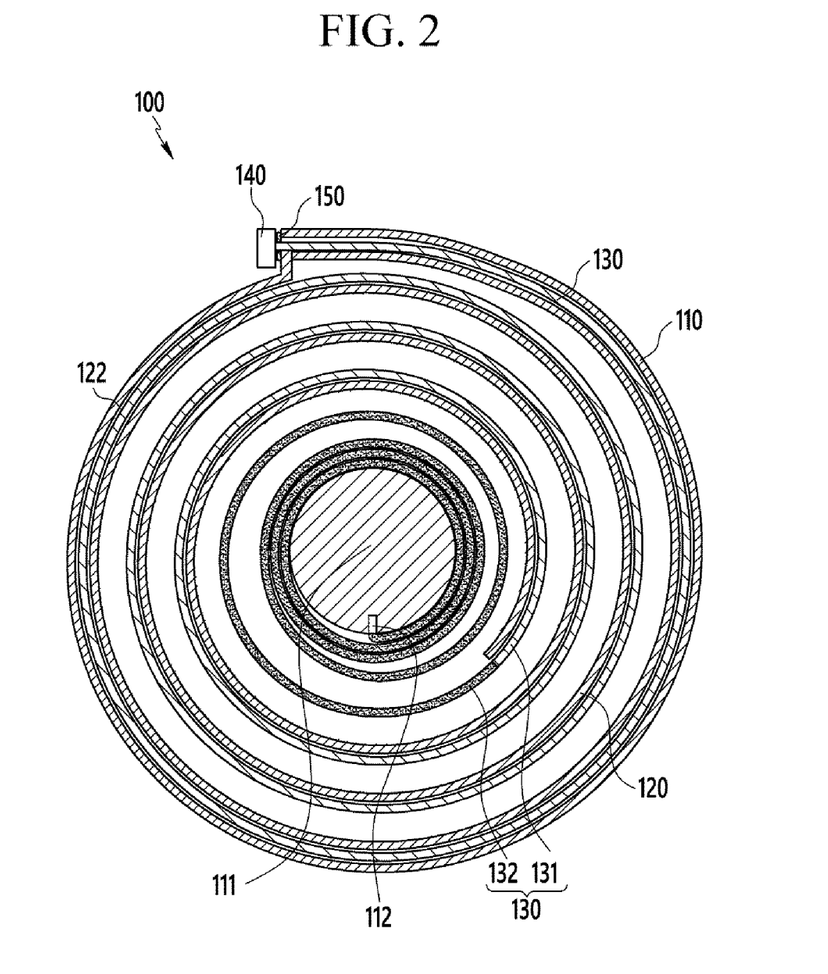
FIG. 2 is a cross-sectional view of the rollable display taken along line II-II of FIG. 1.

FIG. 1 is a perspective view showing a rollable display according to an exemplary embodiment. FIG. 2 is a cross-sectional view of the rollable display according to an exemplary embodiment taken along line II-II of FIG. 1.

Referring to FIGS. 1 and 2, the rollable display 100 includes a flexible display panel 130, a body member or housing 110, a rolling member 111, and a guide member 120.

The flexible display panel 130 can emit light to display images. The flexible display panel 130 is formed of a flexible material such as plastic to maintain its display performance even when it is bent like paper.

The body member 110 has an internal space defined therein. The shape of the body member 110 can be a pillar shape. In some embodiments, the shape of the body member 110 is, for example, a substantially cylindrical shape. When the case has a cylindrical body member 110 it may be easier to hold when compared to a rectangular body member 100. However, the shape of the body member 110 is not limited to a cylindrical shape.

The rolling member 111 is rotatably positioned in the body member 110. The rolling member 111 may be, for example, a roller. The roller can rotate around a shaft (not shown).

The flexible display panel 130 is rolled around the rolling member 111. The rolling member 111 can have a connection part 112 formed therein. The connection part 112 can be, for example, a circuit board 112.

The circuit board 112 is formed so as to be accommodated in the rolling member 111 and can have one end exposed from the rolling member 111. The flexible display panel 130 can be connected to the exposed portion of the circuit board 112. The circuit board 112 can be electrically connected to the flexible display panel 130. The circuit board 112 can supply an image signal or power to the flexible display panel 130.

The guide member 120 has a coil shape, is positioned in the body member 110, and separates portions of the flexible display panel 130 such that they are not closely adhered to each other. That is, the guide member 120 can prevent overlapping portions of the flexible display panel 130 from directly contacting each other.

The guide member 120 can be formed of a material that is not readily deformed, for example, a rigid material. Alternatively, the guide member 120 cam also be formed of a material that can be elastically deformed. In some embodiments, the guide member 120 is integrally formed with the body member 110. In these embodiments, the guide member 120 can be formed of a material that is the same as that of the body member 110.

Portions of the flexible display panel 130 are positioned adjacent to each other by bending the flexible display panel 130 when the flexible display panel 130 is rolled around the rolling member 111 or unrolled from the rolling member 111. These portions of the flexible display panel 130 are spaced apart from each other by the guide member 120. As described above, the guide member 120 prevents the portions of the flexible display panel 130 from contacting each other.

The guide member 120 can have a static electricity preventing coating layer (not shown) formed on a surface 122 thereof that the flexible display panel 130 contacts. Friction can be generated between the flexible display panel 130 and the guide member 120 when the flexible display panel 130 is retracted into and/or drawn out from the body member 110. However, generation of static electricity between the guide member 120 and the flexible display panel 130 can be prevented by the static electricity preventing coating layer.

When static electricity is generated, the frictional force between the flexible display panel 130 and the guide member 120 increases. Therefore, a user needs to apply larger force when he/she draws out the flexible display panel 130 from the body member 110. However, as described above, the generation of the static electricity can be prevented by the static electricity preventing coating layer, such that the user can smoothly draw out the flexible display panel 130 from the body member 110 without using a relatively large force when drawing out the flexible display panel 130 from the body member 110.

The above-mentioned static electricity preventing coating layer can be formed on the guide member 120 by, for example, injecting a static electricity preventing solution onto the guide member 120, but is not limited thereto.

When the rollable display 100 according to an exemplary embodiment configured in the structure as described above is not in use, since the flexible display panel 130 is accommodated in the body member 110 such that the flexible display panel 130 is rolled around the rolling member, a user can easily carry the rollable display. Further, the flexible display panel 130 can be withdrawn from the body member 110 to be used as a display device.

Figure 3:
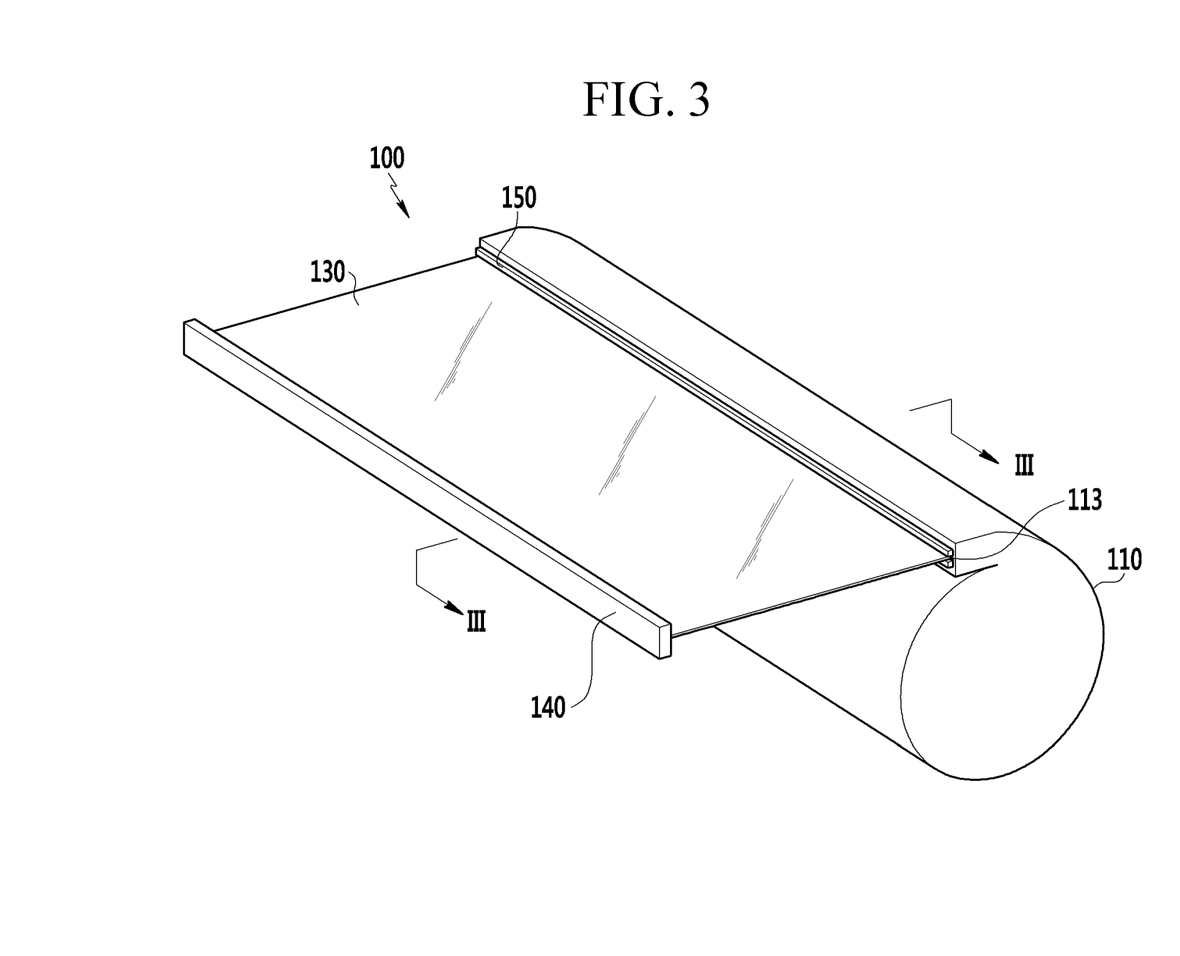
FIG. 3 is a perspective view showing a flexible display panel which is withdrawn from a body member of the rollable display according to an exemplary embodiment shown in FIG. 1.
Figure 4:
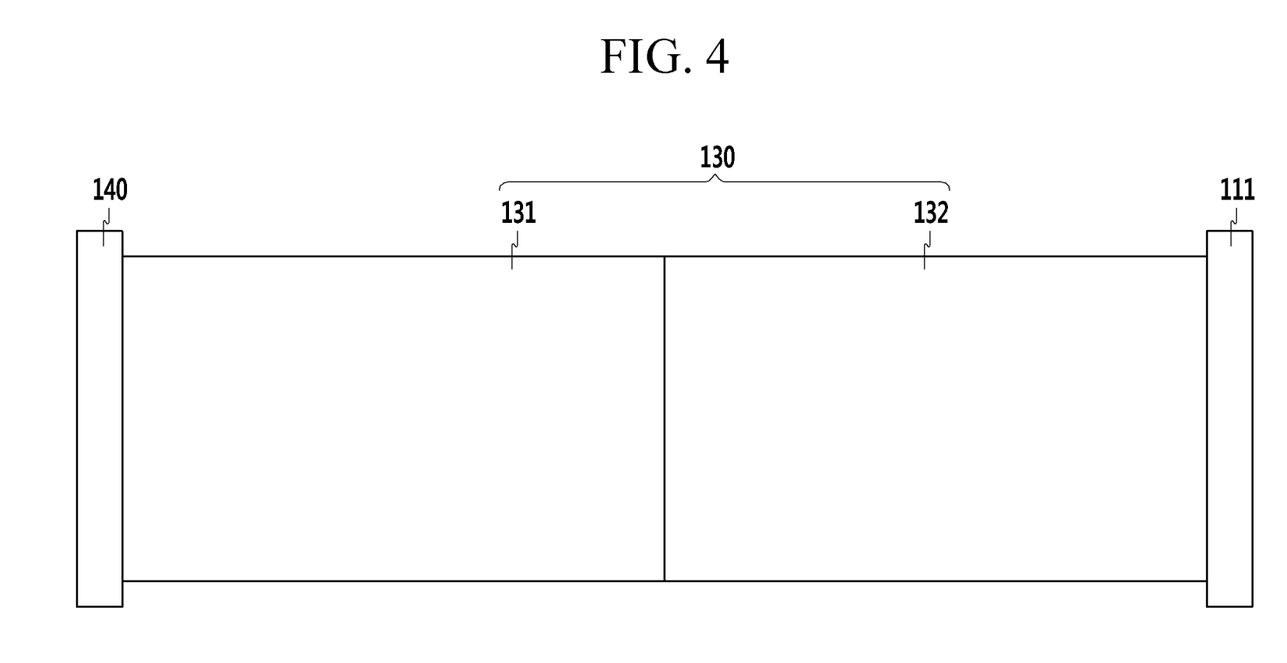
FIG. 4 is a plan view showing only the flexible display panel of the rollable display according to an exemplary embodiment shown in FIG. 3.
Figure 5:
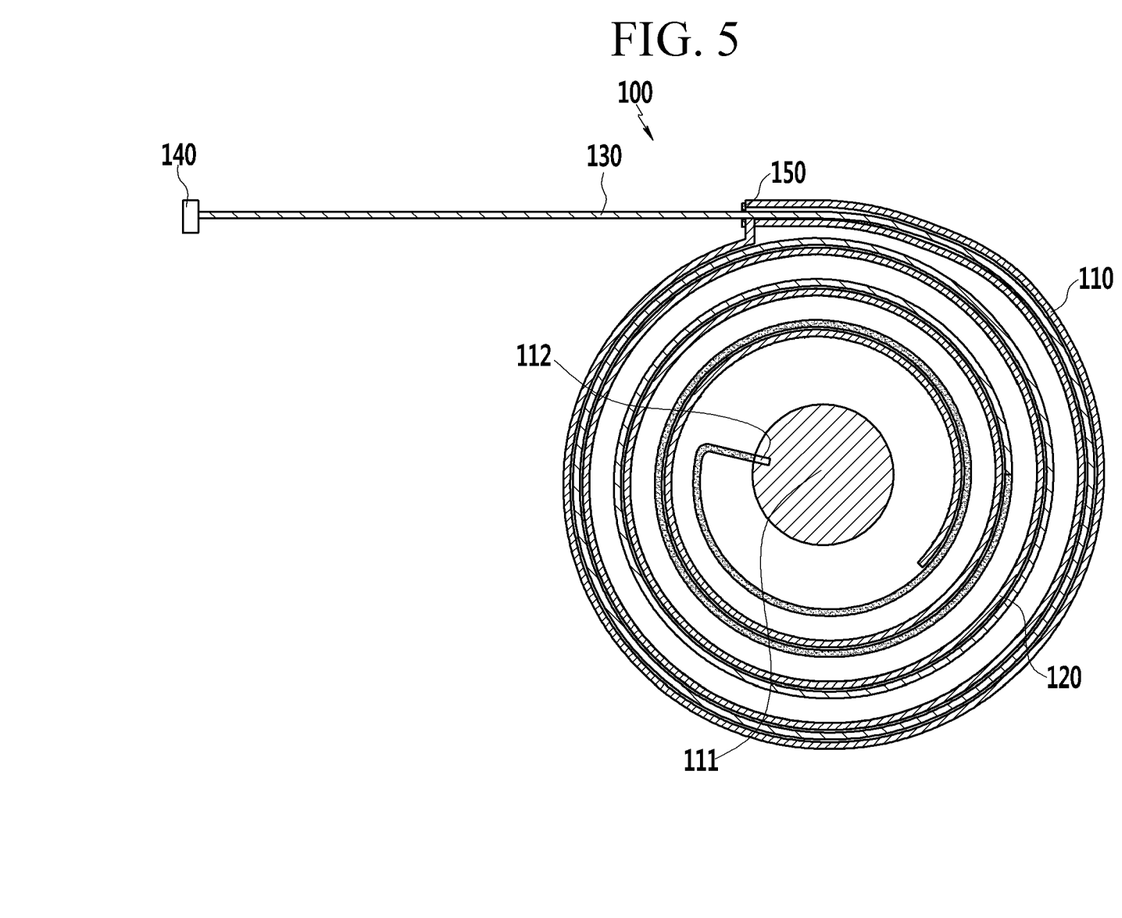
FIG. 5 is a cross-sectional view of the rollable display according to an exemplary embodiment taken along line III-III of FIG. 3.

FIG. 3 is a perspective view showing a flexible display panel which is withdrawn from a body member in the rollable display according to an exemplary embodiment shown in FIG. 1. FIG. 4 is a plan view showing only the flexible display panel of the rollable display according to an exemplary embodiment shown in FIG. 3. FIG. 5 is a cross-sectional view of the rollable display according to an exemplary embodiment taken along line III-III of FIG. 3.

Referring to FIGS. 3 to 5, the rollable display 100 according to an exemplary embodiment further includes a knob member or handle 140. The knob member 140 can have a stick or bar shape and is formed at one end of the flexible display panel 130.

When the flexible display panel 130 is withdrawn from the body member 110, the flexible display panel 130 can be easily handled via the knob member 140. Accordingly, a user does not need to directly contact the flexible display panel 130 in order to draw out the flexible display panel 130 from the body member 110, and thus, it is possible to prevent the surface of the flexible display panel 130 from being marked with fingerprint(s) or other foreign materials.

In the rollable display 100 according to an exemplary embodiment, the body member 110 includes a slit part or opening 113 formed therein via which the flexible display panel 130 enters the body member 110 or exits the body member 110. In addition, the rollable display 100 according to an exemplary embodiment can further include a foreign material introduction preventing member 150. The foreign material introduction preventing member 150 is formed along an edge of the slit part 113 and is positioned so as to be closely adhered to upper and lower surfaces of the flexible display panel 130.

When the flexible display panel 130 is exposed to the environment, foreign materials can be attached to the surface of the flexible display panel 130. The foreign material introduction preventing member 150 removes the foreign materials from the flexible display panel 130 when the flexible display panel 130 is retracted into the body member 110 through the slit part 113. To this end, the foreign material introduction preventing member 150 can be formed of one or more of the following: brush, cloth, and rubber.

Additionally, the structure of the flexible display panel 130 described above can include a display area 131 and a non-display area 132.

An image can be displayed in the display area 131. The non-display area 132 transfers signal(s) to the display area 131. To this end, fine electrode patterns can be formed in the non-display area 132.

In the rollable display 100 according to an exemplary embodiment, the display area 131 is positioned so as to correspond to the guide member 120 when the flexible display panel 130 is rolled around the rolling member 111. In some embodiments, the length of the guide member 120 is substantially the same as the length of the display area 131 of the flexible display panel 130. The end of the display area 131 can be located adjacent to the end of the guide member 120 when the flexible display panel 120 is fully housed within the body member 110.

One end of the guide member 120 can be positioned adjacent to the rolling member 111 and the other end thereof can be positioned adjacent to the slit part. One end of the guide member 120 can be positioned so as to be spaced apart from the rolling member 111 by a predetermined distance. The non-display area 132 of the flexible display panel 130 can be rolled around the rolling member 111 a number of times.

The rollable display 100 according to an exemplary embodiment configured in the above-mentioned structure further includes the guide member 120. The guide member 120 enables portions of the flexible display panel 130 positioned adjacent to each other to be spaced apart from each other when the flexible display panel 130 is rolled around the rolling member 111 or is unrolled from the rolling member 111. Thus, the portions of the flexible display panel 130 are prevented from contacting each other by the guide member 120, thereby making it possible to prevent scratches from being generated on the flexible display panel 130 due to the foreign materials.

Additionally, the rollable display 100 according to an exemplary embodiment can be a portable electronic apparatus such as a mobile phone, a smart phone, a tablet, an electronic book terminal, a personal digital assistant (PDA), a portable multimedia player (PMP), a digital broadcasting receiver, or the like.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it will be understood by those skilled in the art that various modifications and other equivalent exemplary embodiments may be made from the present disclosure. Therefore, an actual technical protection scope of the present disclosure is to be defined by the claims.

What is claimed is:

1. A rollable display, comprising:
   a flexible display panel;
   a housing having an internal space defined therein;
   a rolling member positioned in the housing and configured to have the flexible display panel rolled therearound; and
   a guide member positioned in the housing and having a coil shape, wherein the guide member is configured to separate portions of the flexible display panel from each other and has a spiral structure integrated into the housing.

2. The rollable display of claim 1, wherein the flexible display panel includes a display area configured to display an image and wherein the display area is configured to be supported by the guide member when the flexible display panel is rolled around the rolling member.

3. The rollable display of claim 2, wherein the length of the guide member is substantially the same as the length of the display area of the flexible display panel.

4. The rollable display of claim 1, further comprising a handle attached to one end of the flexible display panel and having a bar shape.

5. The rollable display of claim 1, wherein the housing has an opening formed therein, wherein the flexible display panel is configured to be withdrawn from the opening, wherein the rollable display further comprises a foreign material introduction preventing member formed along an edge of the opening, and wherein foreign material introduction preventing member is configured to be in close contact with upper and lower surfaces of the flexible display panel.

6. The rollable display of claim 5, wherein the foreign material introduction preventing member is formed of at least one of the following: brush, cloth, and rubber.

7. The rollable display of claim 5, wherein one end of the guide member is positioned adjacent to the rolling member, and wherein the other end of the guide member is positioned adjacent to the opening.

8. The rollable display of claim 1, wherein the guide member has a surface configured to prevent static electricity, and wherein the flexible display panel is configured to contact the surface of the guide member.

9. The rollable display of claim 1, wherein the rolling member comprises a circuit board configured to driver the flexible display panel and wherein the rolling member is connected to the flexible display panel via the circuit board.

10. The rollable display of claim 1, wherein the flexible display panel includes: i) a display area configured to display an image and ii) a non-display area, wherein the flexible display panel is connected to the rolling member via the non-display area, wherein the guide member is spaced apart from the rolling member, and wherein the non-display area is configured to be rolled around the rolling member a plurality of times between the rolling member and the guide member.

11. The rollable display of claim 1, wherein the spiral structure has different portions having different lengths and formed between the portions of the display panel.

12. The rollable display of claim 1, wherein the guide member separates the portions of the flexible display panel in a radial direction of the housing.

13. A rollable display, comprising:
a flexible display panel;
a housing having an internal space defined therein;
a rolling member positioned in the housing and configured to have the flexible display panel rolled therearound; and
a guide member positioned in the housing and having a spiral structure, wherein the spiral structure separates different portions of the flexible display panel from each other in a radial direction of the housing.

14. The rollable display of claim 13, wherein the flexible display panel includes a display area configured to display an image and wherein the display area is configured to be supported by the guide member when the flexible display panel is rolled around the rolling member.

15. The rollable display of claim 13, further comprising a handle attached to one end of the flexible display panel and having a bar shape.

16. The rollable display of claim 13, wherein the housing has an opening formed therein, wherein the flexible display panel is configured to be withdrawn from the opening, wherein the rollable display further comprises a foreign material introduction preventing member formed along an edge of the opening, and wherein foreign material introduction preventing member is configured to be in close contact with upper and lower surfaces of the flexible display panel.

17. The rollable display of claim 16, wherein one end of the guide member is positioned adjacent to the rolling member, and wherein the other end of the guide member is positioned adjacent to the opening.

18. The rollable display of claim 13, wherein the rolling member comprises a circuit board configured to driver the flexible display panel and wherein the rolling member is connected to the flexible display panel via the circuit board.

19. The rollable display of claim 13, wherein the flexible display panel includes: i) a display area configured to display an image and ii) a non-display area, wherein the flexible display panel is connected to the rolling member via the non-display area, wherein the guide member is spaced apart from the rolling member, and wherein the non-display area is configured to be rolled around the rolling member a plurality of times between the rolling member and the guide member.

* * * * *